Jan. 13, 1953 P. J. SUNDHEIM 2,625,417
SANDER FOR AUTOMOTIVE VEHICLES
Filed April 29, 1950 2 SHEETS—SHEET 2
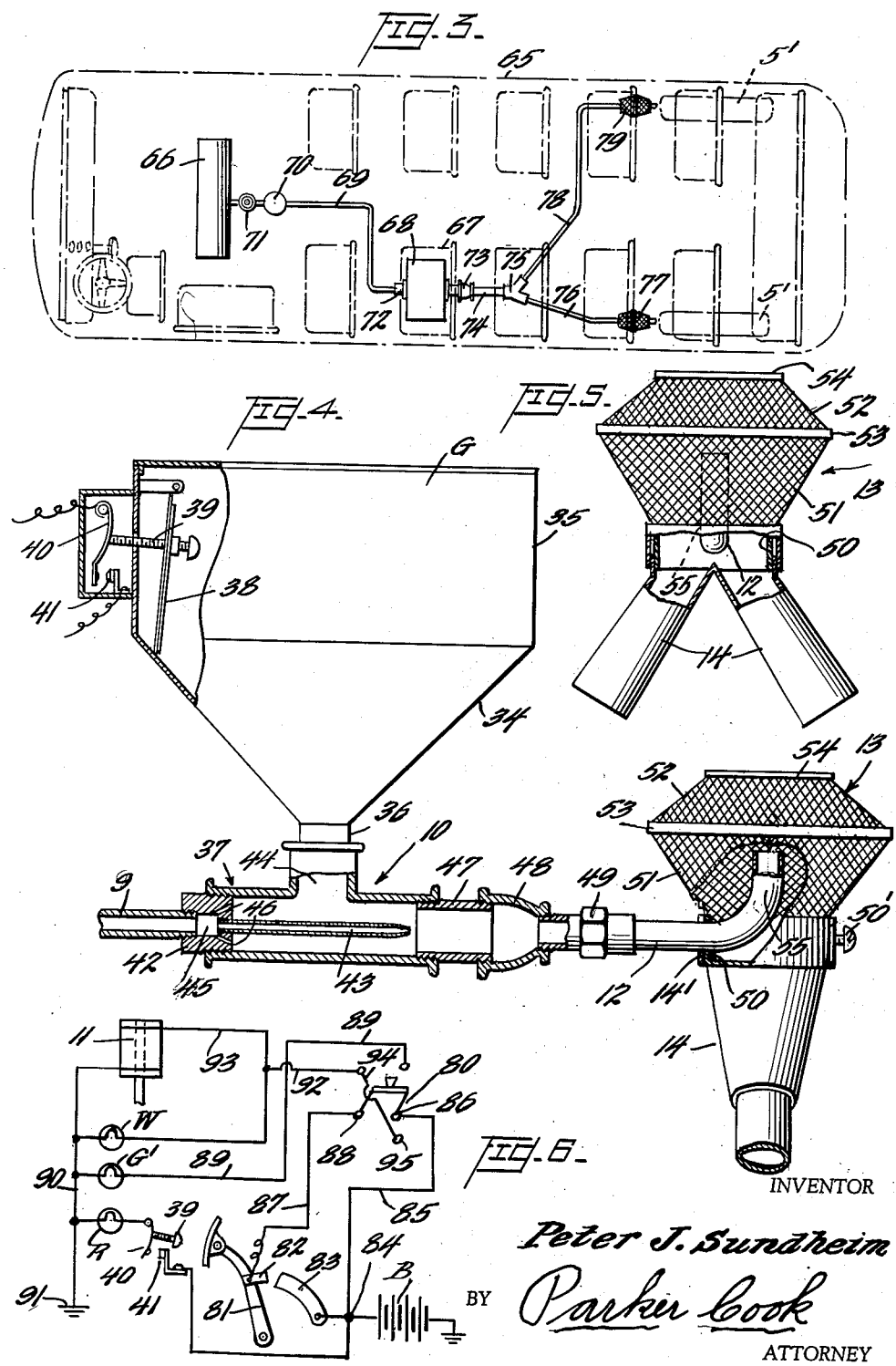
INVENTOR
Peter J. Sundheim
BY Parker Cook
ATTORNEY

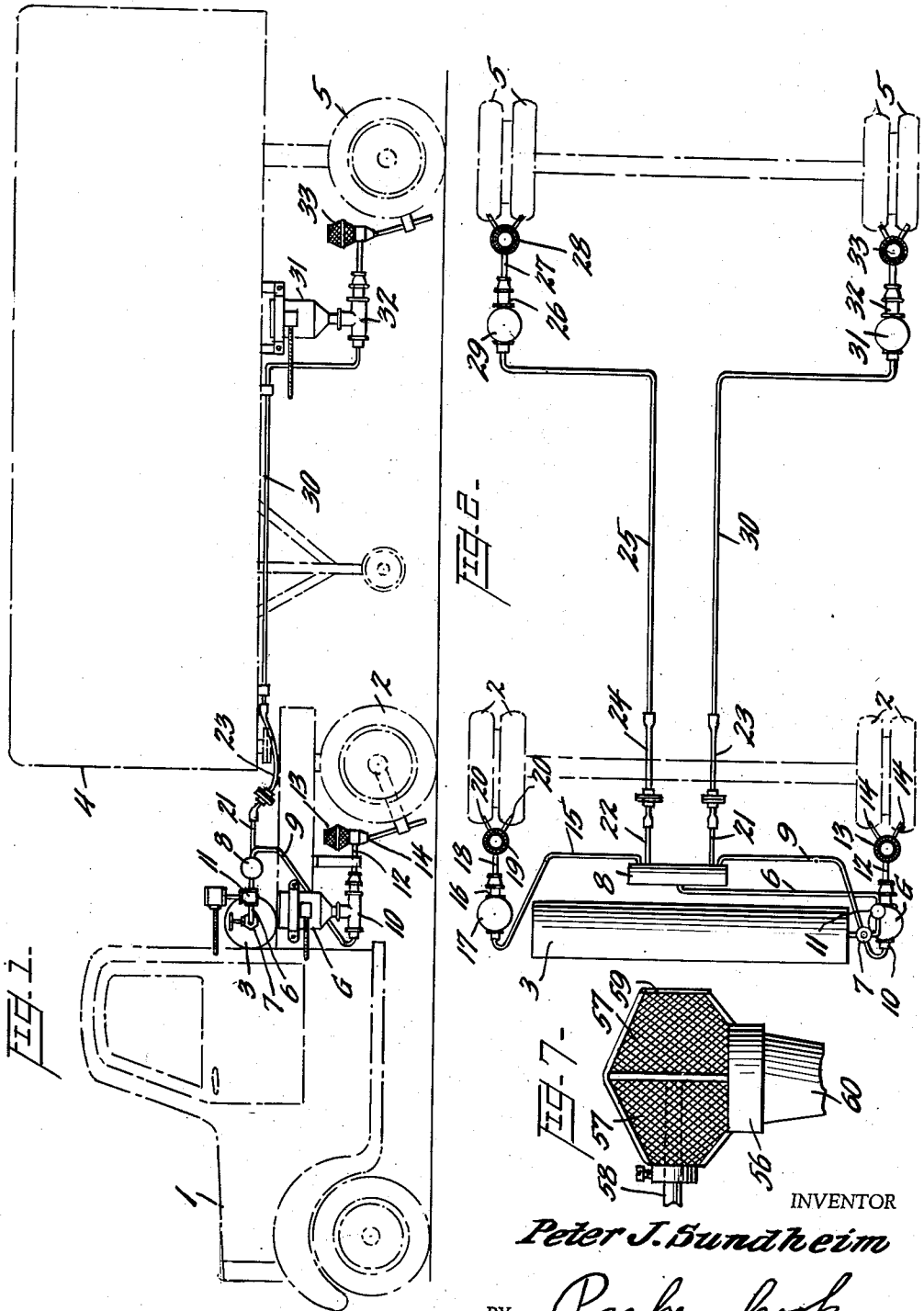

UNITED STATES PATENT OFFICE 2,625,417

SANDER FOR AUTOMOTIVE VEHICLES

Peter J. Sundheim, Buffalo, N. Y.

Application April 29, 1950, Serial No. 158,967

8 Claims. (Cl. 291—3)

My invention relates to a new and useful improvement in sanders, and more particularly, to a sander that is designed for use with a tractor and trailer, other forms of trucks, and also equally adaptable for use on buses.

The types of motor vehicles above mentioned are generally equipped with a storage tank to provide air pressure for the operation of the brakes, and in the case of buses the air pressure is often also utilized to open and close the doors.

The present invention therefore contemplates a system or an arrangement of valves, entrainers, pressure relief chambers and an electrically operated solenoid, so that grit or sand stored in special compartments may be entrained and blown to the pressure relief chambers located in front of the rear wheels of the vehicle and the grit then dropped in front of the wheels.

Still another object of the invention is to provide a simple electric system, wherein the grit may be caused to be discharged in front of the wheels whenever the brake pedal is depressed; or, on the other hand, a switch on the dashboard may be thrown to one position, so that the discharge of the grit will be continual until the switch is again opened. A similar electrical arrangement for operating the solenoid is also shown in detail in an application entitled "A Sander for Automotive Vehicles" filed by me on February 10, 1950, and bearing Serial No. 143,450, now Patent Number 2,587,072, issued February 21, 1952.

However, in the case above mentioned, the solenoid operated a gate or gates in the chamber that held the grit; whereas, in the present application, the electrically operated solenoid operates a valve in the air pressure line, so that the grit or sand may first be entrained from the grit hopper or chamber and then blown to the relief pressure chamber where the air pressure is dissipated and the grit allowed to fall by gravity in front of the wheels.

Still another object of the invention is to provide a sanding arrangement especially for trucks and buses and the like that have four rear wheels.

Still another object of the invention is to provide a sander that is operated either by the ordinary brake pedal and a switch on the dashboard, or both, so that the sand or grit may be blown to and instantly discharged in front of the driving wheels by depressing the brake pedal; or, wherein the grit may be allowed to flow as long as desired.

Still another object of the invention is to provide a sander for buses, trucks and the like, wherein the air from an air storage tank is led to a manifold, while distributing pipes may be run from this manifold to in front of the wheels in which it is desired to drop the grit.

Still another object of the invention is to provide a sanding system that may be readily and quickly attached to a tractor, for instance, and also attached to a trailer, it being only necessary to couple the lead pipes from the trailer to the manifold on the tractor.

Still another object of the invention is to provide a sanding system where only one grit tank might be used and one entrainer with a plurality of distributing pipes and relief chambers; or, a plurality of grit chambers may be used and an entrainer for each grit chamber.

With these and other objects in view, the invention consists in certain new and novel arrangements and combination of parts as will be hereinafter more fully described and pointed out in the claims.

Referring now to the drawings, showing the preferred form and one modification,

Fig. 1 is a side elevation of a tractor and a trailer secured thereto, and showing the sanding system as applied to the tractor and trailer, there being a plurality of sand or grit chambers, Fig. 2 is a diagrammatic top plan view of the sanding arrangement, showing the distribution of the sand or grit to the rear wheels of the tractor and the rear wheels of the trailer, Fig. 3 is a diagrammatic view of a slight modification, showing the system as applied to a bus and wherein only one grit chamber or hopper is utilized, Fig. 4 is a detailed view, partly in section, of the grit chamber, parts being broken away to show the telltale apparatus, and the entraining valve being shown in section for clearness of illustration, Fig. 5 is a detail of a relief chamber, parts being broken away for the sake of clearness, Fig. 6 is a diagrammatic view of a convenient wiring system for operating the sander, and Fig. 7 is a detail of a slightly modified form of relief chamber.

At the outset, it will be understood that I have only shown as much of the tractor, trailer or bus as is necessary to illustrate the manner in which the sanding system is applied to the vehicle.

Referring now for the moment to Figs. 1 and 2, there is shown a tractor 1 with its rear wheels 2 and an air pressure tank 3. There is also shown a trailer 4 with its rear wheels 5.

Referring to Fig. 2 for the moment, it will be seen that the tank 3 is provided with an outlet pipe 6, which is provided with a main cutoff valve 7; and this pipe 6 is connected to an air manifold 8. From the manifold 8 may be seen the air-carrying pipe 9 that extends to an entrainer 10 directly under a grit chamber G.

Also in the main pipe 6 leading from the tank 3 and ahead of the manifold 8 there may also be seen an electrically operated solenoid valve 11 for admitting and cutting off the air supply for the manifold 8. Leading from the entraining valve 10, hereinafter called an entrainer, may be seen an air pipe 12 through which the air and grit are entrained from the chamber G and entrainer 10 and will be blown to the relief chamber 13 with its bifurcated outlets 14 directly in front of the wheels 2 of the tractor 1.

It will be understood that as the specification proceeds, a description will follow of the construction of the entrainer 10 and the chamber G and the pressure relief chamber 13.

Still referring to Fig. 2, there will be seen extending from the manifold 8 a conveyor pipe 15, similar to the pipe 9, and this pipe 15 leads to an entrainer 16 also located under a grit chamber 17, similar to the chamber or hopper G; and from the entrainer 16 leads the pipe 18 to a relief chamber 19 with its bifurcated short arm passageways 20 directly in front of the rear wheels 2 of the tractor 1.

The arrangement just described is similar to the arrangement described for the wheels 2 on the opposite side of the tractor 1 with the exception that the solenoid operated valve 11, of course, is not duplicated; as after the air once gets to the manifold 8 it will pass into the pipes 9 and 15 and then into the heretofore mentioned entrainers 10 and 16 and then to the relief chambers 13 and 19.

Thus, when grit is dropped in front of the rear wheels 2 on one side of the tractor 1, it will also be dropped to the wheels 2 on the opposite side of the tractor 1.

Also, leading from the manifold 8 may be seen the outlet pipes 21 and 22, and there may be seen the flexible connections 23 and 24 connected respectively to these pipes 21 and 22; and then there is a lead pipe 25 to the entrainer 26 which is then connected as at 27 to the relief chamber 28. There will also be the grit hopper 29 operatively connected with the entrainer 26.

This system is repeated on the opposite side, there being the lead pipe 30, the grit hopper 31, the entrainer 32, and the relief chamber 33.

These two relief chambers 28 and 33, it will be noticed, also will drop the grit in front of the rear wheels 5 of the trailer 4. Thus the operation of the solenoid operated valve 11 will admit air to entrain the grit and blow it to the various relief chambers mentioned, where the air will be dissipated and the grit dropped in front of the respective wheels.

It will also be seen that in this form of sander, there is a grit chamber and entrainer for each set of wheels; whereas in the modified form, shortly to be described, as shown in Fig. 3, there is one grit chamber and a Y-shaped connection to distribute the grit from the one chamber to the rear wheels.

Referring now for the moment to Fig. 4, showing an enlarged view of the grit chamber G and the entrainer 10, it will be understood at the outset that a description of one chamber is a description of all.

This grit chamber G will have the slanting bottom walls 34 and the upper vertical side walls 35 and a central outlet as at 36 to which is screwed a coupling 37 which is part of the entrainer 10.

Pivotally mounted to one of the side walls 35 of the chamber G and on the inside of this chamber G is a panel 38 through which passes a set-screw 39 that bears against the spring arm 40 when the hopper G is full to keep the lower end of the arm 40 away from the switch point 41, so that when this hopper or chamber G is filled with grit, the pressure of the grit will force the panel 38 inwardly, as seen in Fig. 4, to keep the spring arm 40 and switch point 41 open; but when the hopper G gets low in grit, the panel 38 will swing out to a vertical position and thus permit the spring-arm 40 to contact the switch point 41 and as these two, that is, 40 and 41, are in the electric wiring circuit, later to be mentioned, a red lamp R will flash on the dashboard.

This is similar to the arrangement shown in my aforementioned co-pending application.

Although this telltale apparatus is repeated in each hopper, there is only one red lamp on the dashboard for the four hoppers, so that it will be necessary for the driver, when the red lamp flashes, to see which grit hopper needs replenishing.

Referring now to what I term the entrainer 10, as heretofore mentioned, it consists of the inverted T-shaped coupling 37 and the plug 42 threaded in the rear end thereof. There is a nozzle 43 threaded in the front of the plug 42 that extends beyond the stem opening 44 in the coupling 37. Threaded in the rear of the plug 42 is the main lead-in air pipe 9 and there is a small chamber 45 between the inner adjacent ends of the nozzle 43 and the pipe 9. From this chamber 45 there are two small passageways 46 in the plug 42 that lead from the chamber 45 so that any grit that might be to the left-hand side of the opening 44 in the coupling 37 will be blown forwardly past the end of the entraining nozzle 43 and thence, of course, to the relief chamber 13, as will shortly be mentioned.

As in all entraining devices, the nozzle 43 extends past the stem opening 44 of the coupling 37; and, it will be understood that after the grit drops down in the coupling 37 and about the nozzle 43, the air pressure will blow the grit through the coupling 37 to the relief chamber 13, and this will cause further grit to not only drop by gravity but be entrained and drawn into the coupling 37.

The air pressure is about one hundred pounds to the square inch, and this air pressure is sufficient to blow the grit through the different lines to the relief chamber 13, and the others, 19, 28, and 33.

To the other end of the coupling 37 may be seen a short nipple 47 and the reducing or coupling socket 48 which in turn is connected by a threaded coupling 49; and then there is the conducting pipe 12 that leads into the reducing chamber 13.

As heretofore mentioned, these entrainers are all similar and so are the reducing chambers, so when one is mentioned by number, the description will fit the others, with the exception of one form of modified relief chamber, which will shortly be mentioned.

Thus, when the solenoid valve 11 (see Figs. 1 and 6) is operated, it will be understood that the air will be led to the manifold 8 and then through the various lead pipes and entrainers to the relief chambers, so that the grit may be dropped in front of the rear wheels of the vehicles.

Referring now to the relief chamber, as shown in Figs. 4 and 5, it will be seen that it consists of a ring 50, with the inverted conical-shaped walls 51 which are made of fine screen mesh, and a light screen frustro-conical wall 52 forming the upper side of the chamber, these screen sections or walls being soldered or fastened centrally by the band 53. Mounted in the top of the frustro-conical shaped portion 52 is a baffle plate or anvil 54.

Fitted about the ring 50 will be the bifurcated legs 14 which in turn are fastened at their upper end to a ring 14' which fits over the ring 50; and this ring 14' will be held about the ring 50 by the set-screw 50'. The ring 14' might have a single leg extending therefrom rather than double legs, as shown in Fig. 5.

It will also be seen that the pipe 12 leading from the entrainer 10 is bent upwardly, as at 55, and extends centrally of this relief chamber 13, so that after the sand or grit passes from the entrainer 10 into the pipe 12 and up through the curved portion 55, it will strike against the undersurface of the anvil or baffle plate 54.

The air, of course, may escape through the mesh screen that forms the side walls of the relief chamber 13, and the air be dissipated. However, the grit, after striking the baffle plate 54 will drop, due to its weight, down into the bifurcated open legs 14, which, it will be remembered, extend directly in front of the rear wheels 2 of the tractor 1; and in the same way, it will be dropped in front of the wheels 5, so that all the wheels of the tractor 1 and trailer 4 will be supplied with the necessary grit when either the foot pedal is depressed or the switch is thrown, as will shortly be mentioned.

Thus, by providing relief chambers for the air pressure and letting the air be dissipated, the grit will drop by gravity in front of the wheels rather than possibly being blown to one side of the path of the wheels.

As mentioned in the co-pending application, the grit is generally a material that is covered with a plastic or asphaltum or tar covering, so that it will not absorb moisture and will flow more freely than, for instance, a damp sand.

In Fig. 7 I have shown a slightly modified form of relief chamber, consisting of a supporting band or ring 56; and mounted thereon are the base-to-base frusto-conical sections 57 made of thin wire mesh and having an opening as at 58 for an inlet pipe, so that the air will blow the grit against a baffle or anvil 59 in the relief chamber which is directly opposite the inlet opening 58. Thus, the air may escape through the wire mesh 57 and the grit will drop in through an outlet leg 60 which is in turn secured to the aforementioned band 56.

Thus, by forming these relief chambers as shown, the single-leg outlet or double-leg outlet may be employed, depending on whether or not there are tandem wheels to be supplied with grit.

Referring now to Fig. 3, showing a slightly modified form of sanding arrangement, there is shown in dotted lines a bus 65, having an air storage tank 66; also shown in dotted lines 67, there is shown a grit chamber or hopper 68, similar in all respects to the grit chamber 9 in the preferred form, while leading from the tank 66 to beneath the grit chamber 68 is the main air supply pipe 69, in which is diagrammatically shown the solenoid-operated valve 70 and the main cut-off valve 71.

This air line 69 leads to an entrainer 72 that is mounted on the under side of the grit chamber 68, in the identical manner as in the preferred form; and from the entrainer 72 there is the reducing coupling 73 similar to the one 48 in the preferred form, and from this coupling 73 extends a small pipe 74 to a Y coupling 75. From the Y leads one branch pipe 76 to the relief chamber 77, while from the other side of the Y extends the pipe 78 to the relief chamber 79, these relief chambers 77 and 79 being mounted directly in front of the rear wheels 5' of the bus 65.

It will be understood that the relief chambers 77 and 79 might be of the form shown in Fig. 5, that is, with the double legs, if the bus 65 should have double wheels on the rear axle.

The operation for this modified form is similar to that in the preferred form and the solenoid valve 70 will be operated by the switch 80, about to be mentioned, on the dashboard. In this arrangement, it will be seen that there is only one entraining valve and only one hopper, and the necessity of a manifold is also done away with.

Referring now to Fig. 6, there is a wiring diagram shown that is very similar to the one shown in my co-pending application, but it will be understood that different energized circuits might be substituted, if desired.

It will be noticed that there is a modified double-pole, double-throw switch 80, the solenoid 11, and there may be seen the brake pedal 81, so that a contact may be made and broken by a point 82 on the brake pedal 81, with a switch point 83 connected by a wire to the battery B, and also connected by wire as at 84 to a lead 85 to one arm 86 of the switch 80.

There is another lead wire 87 from the brake pedal 81 to another arm 88 of the switch 80. There is also a lead wire 89 leading down to the green lamp G' and from there to one of the main wires 90 that is grounded as at 91. There is also a lead wire 92 that connects with the wire 93 leading to the solenoid 11 and also connected to the aforementioned wire 90. Also, in the lead wire 93 there is a white lamp W.

There is also a jumper 94 leading from the wire 92 to a contact post 95.

Thus, when the double-pole, double-throw switch 80 is thrown upwardly, the green lamp G' will be lit and the solenoid 11 will be operated when the foot pedal 81 is depressed, the foot pedal 81 closing the circuit to the solenoid 11 and the green light G'. Also, as the white light W is in circuit with the solenoid 11, it will intermittently flash on and off on a depression of the foot pedal 81.

The green light G', of course, indicates that the sander is ready for intermittent operation in conjunction with the brake.

When the switch 80 is thrown downwardly, the current will pass through the switch 80 and jumper 94 directly to the solenoid valve 11 to open the same and, of course, light the white light W. The flow of grit will be continuous until the switch 80 is again opened.

Also in a circuit will be seen the red light R which is connected with the arm 40 of the microswitch in the hopper G so that when the arm 40 contacts with the spring arm 41, the red light R will be in a closed circuit to show that the grit is getting low within the hopper G.

Thus, it will be seen that by throwing the switch 80 in one direction, that is, down, the white light W on the dashboard will show and the grit will be blown to the relief chambers 77 and 79 etc., and then dropped as long as the switch 80 is closed.

On the other hand, when the switch 80 is thrown up, the green light G' is lit, showing that the sander is ready for intermittent operation, and the white light W will flash when the foot pedal 81 is depressed.

From the foregoing, it will be seen that I have provided a sanding arrangement for buses, trucks, tractors and trailers, wherein either a plurality of grit chambers may be utilized and a number of entraining valves so that the sand can be dropped in front of the rear wheels of the vehicle in which the sander is installed; or, the arrangement may be equally well used on buses, wherein only one grit chamber is used and one entraining valve.

Furthermore, it will be seen that the sander is one in which the sand may be instantly dropped in front of the driving wheels by simply turning the switch on the dashboard, or by depressing the foot pedal.

It will be understood that this sander is to be used when the streets are icy or slippery, rather than when there is a heavy snow on the ground.

Many slight changes might be made without departing from the spirit and scope of the invention. Having thus described my invention, what I claim is new and desire to secure by Letters Patent is:

1. In combination with an automotive vehicle, an air pressure tank, a sand chamber having an opening at its bottom, an entraining valve secured about the opening, an air pipe leading from the pressure tank to said entraining valve; a relief chamber having walls formed of screen mesh and an anvil plate in said chamber, the relief chamber also having a discharge passage located in front of the rear wheel of the automotive vehicle, an air pipe from the entraining valve leading to the relief chamber and its end directed towards said anvil; an energized electric circuit and a solenoid in said circuit, a valve operated by said solenoid, said valve located in the air pipe leading from the pressure tank to the entraining valve; a switch in said energized electric circuit for closing the same to thereby energize the solenoid to in turn cause the said valve to open, whereby the air pressure from the tank will entrain and blow the sand from the sand chamber through the pipe leading to the relief chamber to cause the sand to strike said anvil, the air to be dissipated through the mesh and the sand to drop through the passageway in the relief chamber in front of the rear wheel of the vehicle as long as said switch is closed.

2. In combination with an automotive vehicle, an air pressure tank, a sand chamber having an opening at its bottom, an entraining valve secured about the opening, an air pipe leading from the pressure tank to said entraining valve; a relief chamber having walls formed of screen mesh and an anvil plate in said chamber, the relief chamber also having a discharge passage located in front of the rear wheel of the automotive vehicle, an air pipe from the entraining valve leading to the relief chamber and its end directed towards said anvil; an energized electric circuit and a solenoid in said circuit, a valve operated by said solenoid, said valve located in the air pipe leading from the pressure tank to the entraining valve; a switch in said energizing electric circuit for closing the same to thereby energize the solenoid to in turn cause the said valve to open, whereby the air pressure from the tank will entrain and blow the sand from the said chamber through the pipe leading to the relief chamber to cause the sand to strike said anvil, the air be dissipated through the mesh and the sand drop through the passageway in the relief chamber to in front of the rear wheel of the vehicle as long as said switch is closed; and a brake pedal, also electrically connected in the circuit, for operating said solenoid, to thereby in turn open said valve, so that the sand will be discharged from the relief chamber only as long as the brake pedal is depressed.

3. In combination with an automotive vehicle, an air pressure tank, a grit supply, relief chambers having walls formed of screen mesh, each relief chamber provided with an anvil plate and a discharge passage, the relief chambers and the discharge passages located in front of the respective rear wheels of the vehicle; means for conducting the air from the air pressure tank to said relief chambers; means for entraining the grit from the grit supply to said relief chambers; a solenoid-operated valve located between the air pressure tank and the grit supply; an energized electric circuit having a switch therein for operating the said solenoid-operated valve, an entraining valve operably connected with the relief chambers, grit supply and air pressure supply, so that the grit will be entrained and blown and dropped to in front of the said rear wheels when the said circuit is closed by said switch.

4. In a sanding system for automotive vehicles, an air supply, a sand supply, relief chambers, each relief chamber having perforate walls, an anvil plate and a discharge opening, the said opening to be positioned in front of the driving wheels of the vehicle; pipes for conveying the air and sand from their respective supplies to the relief chambers, the distal ends of the pipes extending within the relief chambers and directed towards the anvils; valve means for opening and closing the air supply to the relief chambers; means for operating said valve which, when open, will allow the air from the air supply to blow the sand to the relief chambers, where the air will escape through the perforate walls and allow the sand to drop through the openings to in front of the driving wheels.

5. In a sanding system for automotive vehicles, an air supply, a sand supply, relief chambers, each relief chamber having perforate walls, an anvil plate and a discharge opening, the said opening to be positioned in front of the driving wheels of the vehicle; pipes for conveying the air and sand from their respective supplies to the relief chambers, the distal ends of the pipes extending within the relief chambers and directed towards the anvils; an electrically operated solenoid valve for opening and closing the air supply to the relief chambers; manually-operated switch means for operating said valve which, when open, will allow the air from the air supply to blow the sand to the relief chambers, where the air will escape through the perforate walls and allow the sand to drop through the openings to in front of the driving wheels.

6. In a sanding system for automotive vehicles, an air supply tank, a plurality of hoppers for holding sand, grit and the like, each hopper having an entraining valve operably associated therewith; a plurality of relief chambers, each relief chamber having perforate walls, an anvil plate and a discharge opening, the said relief chambers positioned in front of the driving wheels of the vehicle; an air manifold, a pipe leading from the air supply tank to said manifold; a plurality of pipes extending from said manifold to the respective entraining valves; pipes extending from the entraining valves to the said respective relief chambers, the distal ends of the last mentioned pipes extending partially within the relief chambers and directed towards the said anvils; a valve for opening and closing the air supply to the manifold; means for operating said valve which, when open, will allow the air from the manifold to pass through the entraining valves to entrain and blow the grit to the said relief chambers, where the air will escape through the perforate walls and allow the grit to drop through the openings to in front of the said driving wheel.

7. In a sanding system for automotive vehicles, an air supply tank, a plurality of hoppers for holding sand, grit and the like, each hopper having an entraining valve operably associated therewith; a plurality of relief chambers, each relief chamber having perforate walls, an anvil plate and a discharge opening, the said relief chambers positioned in front of the driving wheels of the vehicle; an air manifold, a pipe leading from the air supply tank to said manifold; a plurality of pipes extending from said manifold to the respective entraining valves, pipes extending from the entraining valves to the said respective relief chambers, the distal ends of the last mentioned pipes extending partially within the relief chambers and directed towards the said anvils; a valve for opening and closing the air supply to the manifold; electrically operated means, including a hand-operated switch and a foot-operated switch, for controlling the operation of said valve, which, when open will cause the air from the manifold to entrain and blow the grit to the said relief chambers, where the air will escape through the perforate walls and allow the grit to drop through the openings to in front of the said driving wheels.

8. In a sanding system for automotive vehicles, an air supply, a sand supply having an entraining valve operably connected thereto and to the said air supply; relief chambers, each relief chamber having perforate walls, an anvil plate and a discharge opening, the said openings to be positioned in front of the driving wheels of the vehicles; diverging pipes leading from the said entraining valve to the said relief chambers, the distal ends of the pipes extending partially within the relief chambers and directed towards the respective anvils; a valve for opening and closing the air supply to the said relief chambers; electrical means for operating said valve, which valve when open will allow the air to entrain and blow the grit to the respective relief chambers, where the air will escape through the perforate walls and allow the sand to drop through the openings to in front of the driving wheels.

PETER J. SUNDHEIM.

REFERENCES CITED

The following references are of record in the file of this patent:

UNITED STATES PATENTS

| Number | Name | Date |
| --- | --- | --- |
| 1,354,570 | Lamping et al. | Oct. 5, 1920 |
| 1,752,664 | Forcier | Apr. 1, 1930 |
| 1,812,521 | Elston | June 30, 1931 |
| 2,004,859 | Farley | June 11, 1935 |
| 2,266,332 | Pugsley | Dec. 16, 1941 |
| 2,359,029 | Goldberg | Sept. 26, 1944 |
| 2,386,006 | Safford | Oct. 2, 1945 |